United States Patent
Effenberger et al.

(10) Patent No.: US 9,590,724 B2
(45) Date of Patent: Mar. 7, 2017

(54) COOPERATIVE MULTI-POINT (COMP) IN A PASSIVE OPTICAL NETWORK (PON)

(71) Applicant: Futurewei Technologies, Inc., Plano, TX (US)

(72) Inventors: Frank J. Effenberger, Colts Neck, NJ (US); Lei Zong, Ellicott City, MD (US)

(73) Assignee: Futurewei Technologies, Inc., Plano, TX (US)

( * ) Notice: Subject to any disclaimer, the term of this patent is extended or adjusted under 35 U.S.C. 154(b) by 20 days.

(21) Appl. No.: 14/282,879

(22) Filed: May 20, 2014

(65) Prior Publication Data
US 2014/0341561 A1 Nov. 20, 2014

Related U.S. Application Data

(60) Provisional application No. 61/825,404, filed on May 20, 2013.

(51) Int. Cl.
*H04B 10/00* (2013.01)
*G02F 1/00* (2006.01)
(Continued)

(52) U.S. Cl.
CPC ......... *H04B 10/032* (2013.01); *H04L 1/0045* (2013.01); *H04L 1/02* (2013.01);
(Continued)

(58) Field of Classification Search
CPC .... H04B 10/032; H04B 10/035; H04B 10/07; H04B 10/071; H04B 10/80;
(Continued)

(56) References Cited

U.S. PATENT DOCUMENTS

| 4,447,903 A * | 5/1984 | Sewerinson | G06F 11/08 714/821 |
| 5,748,126 A * | 5/1998 | Ma | H03M 3/508 341/143 |

(Continued)

FOREIGN PATENT DOCUMENTS

EP 2249499 A1 11/2010

OTHER PUBLICATIONS

Foreign communication received from a counterpart application, PCT application PCT/US2014/038821, International Search Report dated Aug. 19, 2014, 5 pages.
(Continued)

*Primary Examiner* — Ken N Vanderpuye
*Assistant Examiner* — Abbas H Alagheband
(74) *Attorney, Agent, or Firm* — Conley Rose, P.C.

(57) ABSTRACT

A method for error detection within a passive optical network (PON), the method comprising receiving a first upstream optical signal that is copied at an optical splitter, converting the first upstream optical signal to a first electrical signal, receiving a second electrical signal that is converted from a second upstream optical signal that is copied at the optical splitter, and determining a corrected transmitted data stream using at least the first electrical signal and the second electrical signal, wherein the first upstream optical signal and the second upstream optical signal are copies of an upstream optical signal generated from a plurality of optical network units (ONUs).

18 Claims, 4 Drawing Sheets

US 9,590,724 B2

Page 2

(51) Int. Cl.
*H04B 10/032* (2013.01)
*H04Q 11/00* (2006.01)
*H04L 1/00* (2006.01)
*H04L 1/02* (2006.01)
*H04J 14/02* (2006.01)

(52) U.S. Cl.
CPC ...... *H04Q 11/0067* (2013.01); *H04J 14/0282* (2013.01); *H04J 14/0287* (2013.01); *H04Q 2011/0079* (2013.01); *H04Q 2011/0081* (2013.01)

(58) Field of Classification Search
CPC ............... H04Q 11/0067; H04Q 11/67; H04Q 2011/79; H04Q 2011/81; H04J 14/0287; H04J 14/00; H04J 14/02; H04J 14/04; H04J 14/0298; H04J 14/0282; H04J 14/029; H04L 1/02; H04L 1/45
USPC .................................. 398/5, 2, 9, 16, 25, 28
See application file for complete search history.

(56) References Cited

U.S. PATENT DOCUMENTS

| 5,914,965 | A  | * | 6/1999  | Gauthier ................ H04L 1/242 714/704 |
| 6,754,291 | B1 | * | 6/2004  | Okanoue ............... H04L 25/067 375/316 |
| 6,823,470 | B2 | * | 11/2004 | Smith ....................... H04J 3/14 714/18 |
| 6,838,654 | B2 | * | 1/2005  | Kuo ......................... G01D 5/36 250/214 A |
| 7,158,568 | B2 | * | 1/2007  | Park ....................... H04L 1/0046 375/233 |
| 7,194,047 | B2 | * | 3/2007  | Strolle .................. H04H 20/28 375/262 |
| 7,660,528 | B2 | * | 2/2010  | Hirth ................... H04B 10/2537 398/72 |
| 8,020,039 | B2 | * | 9/2011  | Reid .................... G06F 11/0757 714/10 |
| 8,155,537 | B2 | * | 4/2012  | Saitou .................. H04B 10/695 398/202 |
| 8,380,061 | B2 | * | 2/2013  | Zhou ................... H04B 10/032 398/1 |
| 8,457,492 | B2 | * | 6/2013  | Ohira ................... H04L 1/0009 398/58 |
| 8,472,804 | B2 | * | 6/2013  | Trojer ................ H04Q 11/0067 398/70 |
| 8,538,256 | B2 | * | 9/2013  | Trojer ................. H04B 10/272 398/1 |
| 8,582,966 | B2 | * | 11/2013 | Chen ...................... H04J 3/14 398/5 |
| 8,600,228 | B2 | * | 12/2013 | Rafel Porti .............. H04J 3/14 398/1 |
| 8,615,169 | B2 | * | 12/2013 | Mie ....................... H04L 12/413 398/66 |
| 8,630,548 | B2 | * | 1/2014  | Suvakovic ............ H04J 3/1694 398/167 |
| 8,705,955 | B2 | * | 4/2014  | Grobe ................. H04J 14/0282 398/1 |
| 8,732,561 | B2 | * | 5/2014  | Cai .................... H03M 13/3723 714/776 |
| 9,270,237 | B2 | * | 2/2016  | Imai ....................... H03F 3/087 |
| 9,467,315 | B2 | * | 10/2016 | Dallaire ................ H04L 25/061 |
| 2002/0016933 | A1 | * | 2/2002 | Smith ...................... H04J 3/14 714/4.5 |
| 2002/0109876 | A1 | * | 8/2002 | Eijk ................... H04B 10/032 398/2 |
| 2002/0114028 | A1 | * | 8/2002 | Eijk ................... H04B 10/077 398/2 |
| 2003/0189164 | A1 | * | 10/2003 | Kuo ........................ G01D 5/36 250/214 A |
| 2003/0226086 | A1 | * | 12/2003 | Ahmed ................. H03M 13/00 714/755 |
| 2005/0129107 | A1 | * | 6/2005 | Park ..................... H04L 1/0046 375/233 |
| 2005/0147410 | A1 | * | 7/2005 | Smith ................. H04B 10/032 398/5 |
| 2006/0257148 | A1 | * | 11/2006 | Hirth ................. H04B 10/2537 398/71 |
| 2009/0052891 | A1 | * | 2/2009 | DeLew ................ H04B 10/0793 398/26 |
| 2009/0327836 | A1 | * | 12/2009 | Shimizu ............ H03M 13/2957 714/758 |
| 2010/0023842 | A1 | * | 1/2010 | Rahrer .............. H03M 13/3761 714/776 |
| 2010/0098407 | A1 | * | 4/2010 | Goswami ............ H04B 10/032 398/5 |
| 2010/0119228 | A1 | * | 5/2010 | Zhou .................... H04B 10/032 398/66 |
| 2011/0038629 | A1 | * | 2/2011 | Johansson ............ H04B 10/272 398/58 |
| 2011/0044683 | A1 | * | 2/2011 | Trojer ................. H04B 10/272 398/1 |
| 2011/0158638 | A1 | * | 6/2011 | Mie ....................... H04L 12/413 398/16 |
| 2011/0293265 | A1 | * | 12/2011 | Grobe ................ H04J 14/0282 398/16 |
| 2012/0033972 | A1 | * | 2/2012 | Dai .................... H04L 27/2096 398/58 |
| 2012/0237213 | A1 | * | 9/2012 | Yin ........................ H04L 43/50 398/28 |

OTHER PUBLICATIONS

Foreign communication received from a counterpart application, PCT application PCT/US2014/038821, Written Opinion dated Aug. 19, 2014, 9 pages.
Maamoun, et al., "Survivability Models for Radio-Over-Fiber Passive Optical Networks (RoF-PON)/PON," Computer Science Engineering Conference (ICENCO), 2011 Seventh International Conference, IEEE, Dec. 27, 2011, pp. 13-18.
Pfeiffer, "Evolution of Optical Access Network Technologies," Proceedings of SPIE., vol. 7607, Feb. 3, 2010, p. 760616-1 through 760616-12.
Choi, et al., "Mobile Backhaul Optical Access Networks for Coordinated Multipoint Transmission/Reception (CoMP) Techniques in Future Cellular Systems," IEICE Transactions on Electronics, Institute of Electronics, Tokyo, JP, vol. E96-C, No. 2, Feb. 1, 2013, pp. 147-155.
"IEEE Standard for Ethernet," IEEE Computer Society, IEEE Standard 802.3-2012—Section 1, Dec. 28, 2012, 634 pages.
"IEEE Standard for Ethernet," IEEE Computer Society, IEEE Standard 802.3-2012—Section 2, Dec. 28, 2012, 780 pages.
"IEEE Standard for Ethernet," IEEE Computer Society, IEEE Standard 802.3-2012—Section 3, Dec. 28, 2012, 358 pages.
"IEEE Standard for Ethernet," IEEE Computer Society, IEEE Standard 802.3-2012—Section 4, Dec. 28, 2012, 732 pages.
"IEEE Standard for Ethernet," IEEE Computer Society, IEEE Standard 802.3-2012—Section 5, Dec. 28, 2012, 844 pages.
"IEEE Standard for Ethernet," IEEE Computer Society, IEEE Standard 802.3-2012—Section 6, Dec. 28, 2012, 400 pages.
"Series G: Transmission Systems and Media, Digital Systems and Networks—Digital Sections and Digital Line System—Optical Line Systems for Local and Access Networks—Gigabit-Capable Passive Optical Networks (GPON): General Characteristics," ITU-T Recommendation G.984.1, Mar. 2008, 43 pages.
"Series G: Transmission Systems and Media, Digital Systems and Networks—Digital Sections and Digital Line System—Optical Line Systems for Local and Access Networks—Gigabit-Capable Passive Optical Networks (GPON): General Characteristics, Amendment 1," ITU-T Recommendation G.984.1 Amendment 1, Oct. 2009, 4 pages.
"Series G: Transmission System and Media, Digital Systems and Networks—Digital Sections and Digital Line System—Optical (56) References Cited

OTHER PUBLICATIONS

Line Systems for Local and Access Networks—Gigabit-Capable Passive Optical Networks (GPON): Physical Media Dependent (PMD) Layer Specification, Amendment 2," ITU-T Recommendation G.984.2 (2003) Amendment 2, Mar. 2008, 16 pages.

"Series G: Transmission Systems and Media, Digital Systems and Networks—Digital Sections and Digital Line System—Optical Line Systems for Local and Access Networks—Gigabit-Capable Passive Optical Networks (GPON): Transmission Convergence Layer Specification," ITU-T Recommendation G.984.3, Mar. 2008, 146 pages.

"Series G: Transmission Systems and Media, Digital Systems and Networks—Digital Sections and Digital Line System—Optical Line Systems for Local and Access Networks—Gigabit-Capable Passive Optical Networks (GPON): Reach Extension," ITU-T Recommendation G.984.6, Mar. 2008, 40 pages.

"Series G: Transmission Systems and Media, Digital Systems and Networks—Digital Sections and Digital Line System—Optical Line Systems for Local and Access Networks—Gigabit-Capable Passive Optical Networks (GPON): Reach Extender (RE) Units, Amendment 1," ITU-T Recommendation G.984.6 Amendment 1, Nov. 2009, 20 pages.

"Series G: Transmission Systems and Media, Digital Systems and Networks—Digital Sections and Digital Line System—Optical Line Systems for Local and Access Networks—Broadband Optical Access Systems Based on Passive Optical Networks (PON)," ITU-T Recommendation G.983.1, Jan. 2005, 124 pages.

"Series G: Transmission Systems and Media, Digital Systems and Networks—Digital Sections and Digital Line System—Optical Line Systems for Local and Access Networks—A Broadband Optical Access System with Enhanced Survivability," ITU-T Recommendation G.983.5, Jan. 2002, 60 pages.

"Series G: Transmission Systems and Media, Digital Systems and Networks—Digital Sections and Digital Line System—Optical Line Systems for Local and Access Networks—Gigabit-Capable Passive Optical Networks (GPON): Physical Media Dependent (PMD) Layer Specification," ITU-T Recommendation G.984.2, Mar. 2003, 38 pages.

"Series G: Transmission Systems and Media, Digital Systems and Networks—Digital Sections and Digital Line System—Optical Line Systems for Local and Access Networks—Gigabit-Capable Passive Optical Networks (GPON): Physical Media Dependent (PMD) Layer Specification Amendment 1: New Appendix III—Industry Best Practice for 2.488 Gbit/s Downstream, 1.244 Gbit/s Upstream G-PON," ITU-T Recommendation G.984.2 (2003) Amendment 1, Feb. 2006, 12 pages.

* cited by examiner

| No. | 1 | 2 | 3 | 4 | 5 | 6 | 7 | 8 | 9 |
|---|---|---|---|---|---|---|---|---|---|
| 312 — Rx A | 1 | 0 | 1 | 1 | 0 | 1 | 1 | 0 | 1 |
| 314 — Rx B | 1 | 0 | 0 | 1 | 0 | 0 | 1 | 0 | 1 |

COOPERATIVE MULTI-POINT (COMP) IN A PASSIVE OPTICAL NETWORK (PON)

CROSS-REFERENCE TO RELATED APPLICATIONS

The present application claims priority to U.S. Provisional Patent Application No. 61/825,404 filed May 20, 2013 by Frank Effenberger, et al. and entitled "Co-Operative Multi-Point (COMP) in Passive Optical Network (PON)," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Rapid growth of Internet traffic, driven by the proliferation of video services, continues to push broadband optical access networks for higher data rates and better quality of services. A passive optical network (PON) is a system for providing network access over "the last mile." In a downstream direction, the PON may be a point-to-multi-point (P2MP) network comprising an optical line terminal (OLT) at a central office (CO), a plurality of optical network units (ONUs) at customer premises, and an optical distribution network (ODN) connecting the OLT and the ONUs. PONs may also comprise remote nodes (RNs) located between the OLTs and the ONUs, for example, at the end of a road where multiple users reside. PON systems may also employ a Type B backup protection system that utilizes more than one OLT. One OLT may be designated as a primary OLT and the other OLTs (e.g. one or more other OLTs) may be designated as a backup OLT. The backup OLTs may be in stand-by mode until the primary OLT fails. Afterwards, one of the backup OLTs may engage and provide a seamless transition for the ONUs, and thereby avoids any disconnect in the system when the primary OLT fails.

SUMMARY

In one embodiment, the disclosure includes an apparatus for detecting errors within a PON, comprising a memory, a processor coupled to the memory, wherein the memory includes instructions that when executed by the processor cause the apparatus to perform the following: obtain a first information stream from a first upstream optical signal, obtain a second information stream from a second upstream optical signal, and determine a corrected transmitted information stream using at least the first information stream and the second information stream, wherein the first optical signal and the second optical signal are received at an optical line terminal and from an optical distribution network.

In another embodiment, the disclosure includes a method for error detection within a PON, the method comprising receiving a first upstream optical signal that is copied at an optical splitter, converting the first upstream optical signal to a first electrical signal, receiving a second electrical signal that is converted from a second upstream optical signal that is copied at the optical splitter, and determining a corrected transmitted data stream using at least the first electrical signal and the second electrical signal, wherein the first upstream optical signal and the second upstream optical signal are copies of an upstream optical signal generated from a plurality of ONUs.

In yet another embodiment, the disclosure includes a PON system comprising an ODN coupled between a plurality of OLTs and a plurality of ONUs, an optical splitter located within the ODN that is configured to produce a plurality of copied upstream optical signals from an upstream optical signal and forward the copied upstream optical signals to the OLTs, and a joint decoding node configured to receive a plurality of data streams that are generated from the copied upstream optical signals from the OLTs and determine the corrected upstream data transmitted using the data signals.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A PON is a point-to-multi-point (P2MP) network comprised of an OLT at the central office, an ODN, and a plurality of ONUs at the customer premises. Ethernet passive optical network (EPON) is a PON standard developed by the Institute of Electrical and Electronics Engineers (IEEE) and specified in IEEE 802.3, which is incorporated herein by reference as if reproduced in its entirety. In EPON, a single fiber can be used for both the upstream and the downstream transmission with different wavelengths. The OLT implements an EPON Media Access Control (MAC) layer for transmission of Ethernet frames. The Multi-Point Control Protocol (MPCP) performs the bandwidth assignment, bandwidth polling, auto-discovery, and ranging. Ethernet frames are broadcast downstream based on the Logical Link Identifier (LLID) embedded in the preamble frame. Upstream bandwidth is assigned based on the exchange of Gate and Report messages between an OLT and an ONU. In addition to EPON, other protocols may be implemented in a PON. Examples of such protocols include the asynchronous transfer mode (ATM) PON (APON) and the broadband PON (BPON) defined by the International Telecommunications Union (ITU) Telecommunication Standardization Sector (ITU-T) G.983 standard, Gigabit PON (GPON) defined by the ITU-T G.984 standard, wavelength division multiplexing (WDM) PON (WDM-PON), time and wavelength division multiplexed (TWDM) PON, Orthogonal Frequency Division Multiplexed (OFDM) PON and Optical Code Division Multiplexed (OCDM) PON. The ITU-T G.983 and ITU-T G.984 standards are incorporated herein by reference as if reproduced in their entirety.

PONs face the increasing challenge of extended reach, higher data rate, and larger fan-out. All three factors demand more signal power, especially from the upstream signals because the light sources at the ONU are more sensitive to cost and power consumption. As bandwidth-demanding services, such as video-on-demand (VoD), online gaming, and high definition television (HDTV), attract more and more users, PON data rate may increase from a several hundred Megabit Asymmetrical PON (A-PON) to Gigabit PON (GPON) and EPON, 10 G PON (XG-PON) and/or a 40 G PON (NG-PON2). At the same time, in order to reduce operational expenses (OPEX), carriers are consolidating the central offices (COs) and simplifying the hierarchy of the networks, which results in extended reach over 20 kilometers and larger splitting ration beyond 1:64. All these factors require more link power budget in PON designs. To support all the above demand, the ITU-T have passed a standard ITU-T G.984.6, which is incorporated herein by reference as if reproduced in its entirety, to mitigate the issue with optical amplification and regeneration. However, the ITU-T G.984.6 standard introduces active components into the ODN that are typically undesired because the active components (e.g. a powered optical splitter) may significantly increase network deployment cost and maintenance cost.

Disclosed herein are at least one method, apparatus, and/or system for determining errors in an upstream data stream within a PON system. A PON system, such a Type B backup PON system, may comprise a plurality of OLTs. Each of the OLTs, whether they are active or not, may receive a copy of an upstream optical signal transmitted from the ONUs via an optical splitter located between the ONUs and OLTs. The optical splitter may produce one or more copies of the upstream optical signal received from the ONUs in order to transmit a copy of the upstream optical signal to each of the OLTs. The upstream optical signals received at each of the OLTs may be jointly processed and decoded to improve identification of errors in the received upstream optical signal and/or data stream. In other words, the PON system may be configured to implement a cooperative approach to jointly process upstream optical signals at one or more points within the PON system in order to enhance the system performance and attempt to mitigate the use of a power budget.

Figure 1:
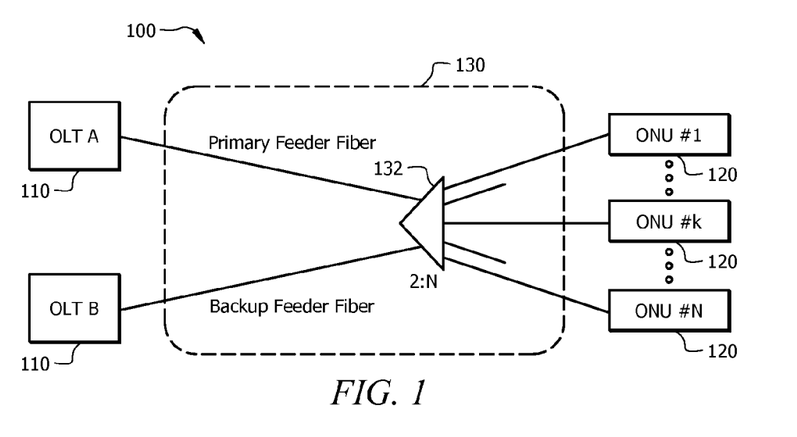
FIG. 1 is a schematic diagram of an embodiment of a PON system, where embodiments of the present disclosure may operate.

FIG. 1 is a schematic diagram of an embodiment of a PON system 100, where embodiments of the present disclosure may operate. The PON system 100 may be an optical access network or part of an optical access network that comprises a plurality of OLTs 110, a plurality of ONUs 120, and an ODN 130. The PON system 100 is a communications network that may not require any active components to distribute data between the OLTs 110 and the ONUs 120. Instead, the PON system 100 may use the passive optical components in the ODN 130 to distribute data between the OLTs 110 and the ONUs 120. Examples of suitable PONs 100 include the APON and the BPON defined by the ITU-T G.983 standard, the GPON defined by the ITU-T G.984 standard, the EPON defined by the IEEE 802.3 standard, the WDM PON, the TWDM PON, a Next Generation Access (NGA) system, such as an XGPON, and/or combinations thereof.

An OLT 110 may be any device, such as an OLT line card, that is configured to communicate with the ONUs 120 and an external network (not shown). Specifically, an OLT 110 may act as an intermediary between the external network (e.g. a service provider network) and the ONUs 120. For instance, the OLT 110 may forward data received from the network to the ONUs 120, and forward data received from the ONUs 120 onto the external network. Although the specific configuration of the OLTs 110 may vary depending on the type of PON system 100, in an embodiment, the OLT 110 may each comprise a transmitter and a receiver. When the other network is using a protocol, such as Ethernet or Synchronous Optical Networking/Synchronous Digital Hierarchy (SONET/SDH), that is different from the communications protocol used in the PON 100, the OLT 110 may comprise a converter that converts the other network's data into the PON's protocol. The converter may also convert the PON's data into the other network's protocol. The OLT 110 described herein is typically located at a central location, such as a central office, but may be located at other locations as well.

The PON system 100 may be a PON with a Type B backup protection system that utilizes more than one OLT 110. A network administrator or operator may designate which OLT 110 is the primary OLT and which OLT(s) 110 is the backup the OLT 110. Using FIG. 1 as an example, OLT A 110 may be designated as the primary OLT 110 and OLT B 110 may be designated as a backup OLT 110. The backup OLT B 110 may be in stand-by mode until the primary OLT A 110 fails. After failure of the primary OLT A 110, the backup OLT B 110 may engage and provide a seamless transition for the ONUs 120, thereby avoiding any disconnect in the system when the primary OLT A 110 fails. Switch-overs and determining a failure of a primary OLT A 110 may occur when the backup OLT B 110 no longer detects an incoming signal coming from the primary OLT A 110. At some point after the failure, the primary OLT A 110 may be restored and communication may either switch back to the primary OLT A 110 or stay with the backup OLT B 110. Details of the Type B protection for PON system 100 may be described within ITU-T G.984.1 standard and the ITU-T G.983.5 standard, both of which are incorporated herein by reference as if reproduced in their entirety.

The ODN 130 is a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLTs 110 and the ONUs 120. It should be noted that the optical fiber cables may be replaced by any optical transmission media in some embodiments. In some embodiments, the ODN 130 may comprise one or more optical amplifiers. The ODN 130 typically extends from the OLTs 110 to the ONUs 120 in a branching configuration as shown in FIG. 1, but may be alternatively configured as determined by a person of ordinary skill in the art.

In particular, FIG. 1 illustrates that ODN 130 may comprise an optical splitter 132 that is configured to receive N upstream optical signals from ONUs 1-N 120 and combines the N upstream optical signals to form a combined upstream optical signal. N may be an integer and may represent the number of ONUs coupled to the ODN 130. The optical splitter 132 may also copy the combined upstream optical signal and output two of the combined upstream optical signals. OLT A 110 receives one of the combined upstream optical signals and OLT B 110 receives the other combined upstream optical signal. Although FIG. 1 illustrates that the optical splitter 132 is a 2:N (2 outputs and N inputs in the upstream direction), other embodiments of the PON system 100 may comprise a M:N optical splitter 132, where M is an integer greater than two and represents the number of OLTs 110 coupled to the ODN 130. In other words, M may represent the number of primary and second OLTs 110 in a Type B backup PON system.

The ONUs 120 may be devices that are configured to communicate with the OLTs 110 and a customer or user (not shown). Specifically, the ONUs 120 may act as an intermediary between the OLTs 110 and the customer. For instance, the ONUs 120 may forward data received from the OLTs 110 to the customer, and forward data received from the customer onto the OLTs 110. Although the specific configuration of the ONUs 120 may vary depending on the type of PON system 100, in an embodiment the ONUs 120 may comprise an optical transmitter configured to send optical signals to the OLTs 110. Additionally, the ONUs 120 may comprise an optical receiver configured to receive optical signals from the OLTs 110 and a converter that converts the optical signal into electrical signals for the customer, such as signals in the ATM or Ethernet protocol. The ONUs 120 may also comprise a second transmitter and/or receiver that may send and/or receive the electrical signals to a customer device. In some embodiments, ONUs 120 and optical network terminals (ONTs) are similar, and thus the terms are used interchangeably herein. The ONUs 120 are typically located at distributed locations, such as the customer premises, but may be located at other locations as well.

Throughout this disclosure the term "upstream" refers to the direction that the optical signals travel from an ONU 120 to an OLT 110. The term "downstream" refers to the direction that the optical signals travel from an OLT 110 to an ONU 120. Additionally, the term "optical signal" may refer to one or more wavelengths used to encode, transmit, and/or receive data. In one embodiment, each of the wavelengths may be a range of wavelengths. For example, a wavelength may have a wavelength value of about 1596 nanometers (nm) with a tolerance of plus or minus 0.1 nm. Additionally, each of the wavelengths within an optical signal may be separated with a certain channel spacing (e.g. a 50 gigahertz (GHz) or 100 GHz spacing).

Figure 2:
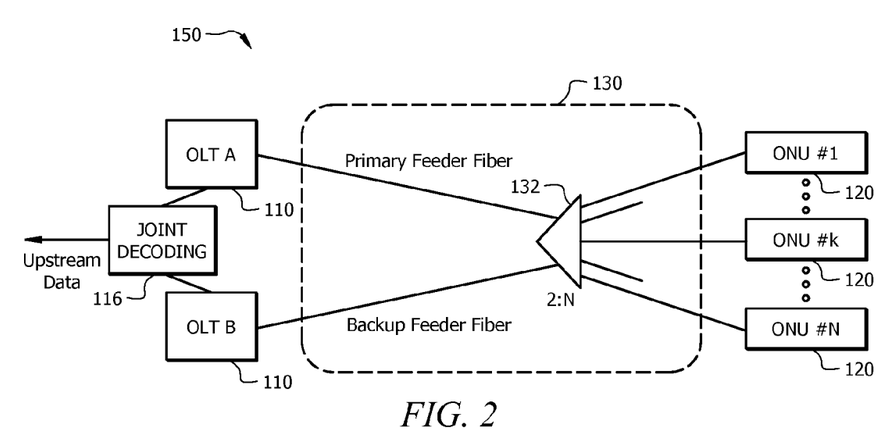
FIG. 2 is a schematic diagram of an embodiment of a Type B PON system that comprises a joint decoding node.

FIG. 2 is a schematic diagram of an embodiment of a Type B PON system 150 that comprises a joint decoding node 116. As shown in FIG. 2, an embodiment of the Type B PON system 150 may have a Type B protection using two OLTs 110 that receive the combined upstream optical signal at about the same time from the optical splitter 132. The way multiple OLTs 110 work in a protected Type B PON system 150 may provide a practical way to achieve multi-point access in the network. An optical splitter 132 may combine the upstream signals from multiple ONUs 120, and may send two copies of the multiplexed signals to the two separate OLTs 110 through the primary and backup feeder fibers, respectively. In normal operation, only OLT A 110 that connects to the primary feeder fiber communicates with the ONUs 120, while OLT B 110 (the backup OLT) is in standby mode. When the primary feeder fiber or OLT A 110 fails, OLT B 110 may become active and communicate with the ONUs 120.

However, all active ONUs 120 in the PON 100 may register in both OLTs 110 with their serial number, subscriber identifier (ID), service profile, and other network/device information. Both OLTs 110 may receive the upstream signals from the ONUs 120 and process the received data, but typically only the primary OLT 110 may be active, while the backup OLT 110 may be in standby mode. Such a system provides seamless protection operation; otherwise, when a network failure occurs and the primary OLT A 110 becomes inactive, the ONUs 120 would be out-of-service and could require completing the registration process again. In the downstream direction, only the working OLT A 110 may send signals to the ONUs 120 (unless a fail occurs), while the backup OLT B 110 may shut down its transmitter at all times to avoid jamming issues.

In the embodiment of FIG. 2, the upstream optical signals received by the OLTs 110 from the ONUs 120 via the optical splitter 132 may be compared and/or combined using a Cooperative Multi-Point (CoMP) system. The disclosed CoMP approach may utilize the multiple OLTs 110 in a Type B PON system 150 (shown in FIG. 2), with one primary OLT A 110 that communicates with the ONUs 120 while the rest of the OLTs 110 (e.g. OLT B 110) are in standby mode and may only receive the upstream signals. A Type B PON system 150 is an embodiment of a PON with a configuration similar to the PON architecture of shown in FIG. 1, (e.g. with two OLTs that connect to the optical splitter 132 through two separate feeder fibers). The receivers in both OLTs 110 may be turned on to receive the upstream optical signal at about the same time and a joint decoding node 116 may connect to the two OLT 110 receivers to share the information of the received data in the OLTs 110.

Each of the OLTs 110 (e.g. OLT A 110) may receive the combined optical signals and convert the combined optical signal to an electrical signal. The joint decoding node 116 may be configured to receive both the electrical signals and jointly process the data information within the electrical signal received from the OLTs to correct data errors with higher efficiency. Jointly processing the signals at multiple access points in the network may improve the link budget, and therefore may increase network reach and reduce terminal equipment rating. In some embodiments, the joint decoding node 116 may be one or more cooperative error-correction units (CECUs) that are located within one or more OLTs 110. For example, OLT A 110 and OLT B 110 may each comprise a CECU. In some embodiments, CECUs may be easily added into legacy PON systems, such as GPON and XGPON, may be integrated into future PON systems, and may also have the potential to be added into the Full Service Access Network (FSAN)/ITU-T standards for next generation PON technologies. Throughout this disclosure, the joint decoding node 116 may also be referred to as a CECU.

Figure 3:
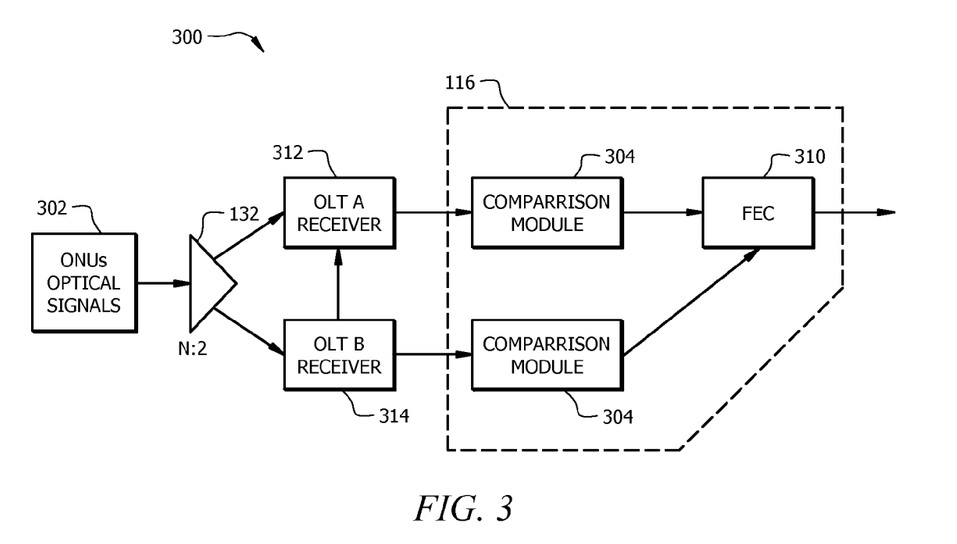
FIG. 3 illustrates an embodiment of a signal diagram used to check for errors for an upstream transmission within a PON system.

FIG. 3 illustrates an embodiment of a signal diagram used to check for errors in an upstream transmission within a PON system 300. As shown in the signal diagram of FIG. 3, the optical splitter 132 may receive the ONUs optical signals 302, generate two copies of a combined optical signal, and forward the copies to the OLT receivers 312 and 324. Afterwards, information and data sharing may be conducted at two stages for the OLT receiving process. The information and data may be received in a combined optical signal from the optical splitter 132 at OLT receiver 312 and OLT receiver 314. The first stage may comprise the decision making stage, wherein each of the OLT receivers 312 and 314 converts the combined optical signal to an electrical signal by determining the received analog signal as a "1" or "0" at the sampling point. Conversion of the optical signal to an electrical signal may be implemented using any method, mechanism, process, and/or device known by persons of ordinary skill in the art. For example, a Positive-Intrinsic-Negative photodiode (PIN) photodetector and/or an avalanche photodiode (APD) photodetector may be used to convert an optical signal to an electrical signal.

The second stage may be implemented in the joint decoding node 116. As shown in FIG. 3, the joint decoding node 116 may correspond to the second stage and may comprise one or more comparison modules 304 and a forward error correction (FEC) module 310. Using the comparison modules 304 and FEC module 310, the joint decoding node 116 attempts to find and correct errors in the received combined optical signal. The joint decoding node 116 may be configured to implement a hard-decision FEC, a soft-decision FEC, or both. With hard-decision FEC, each of the comparison modules 304 may be configured to make a decision of the incoming bit value for the electrical signal based on the comparison of the received electrical signal and a hard threshold. The comparison module 304 may determine a "1" is detected if the signal is above the threshold; otherwise a "0" is detected. The detected "1"s and "0"s are then fed into the FEC decoder 310 for error correction. For a soft-decision FEC (also known as soft decoding) is used in the system, the decision-making is based on more levels of threshold for a finer granularity to estimate the chance that the receiving signal has a "1" or "0" for this bit. Hard-decision FEC will be discussed in more detail later in the disclosure.

FIG. 3 illustrates that the pre-corrected electrical signals could be compared via one or more comparison modules 304 for the OLTs 312 and 314. Throughout this disclosure, pre-corrected electrical signals are electrical signals prior to FEC decoding. In FIG. 3, the comparison module 304 associated with OLT A receiver 312 may also receive the pre-corrected electrical signal from the comparison module 304 associated with OLT B receiver 314. The comparison module 304 associated with OLT A receiver 312 may compare the two pre-corrected electrical signals and discrepancies in the pre-corrected electrical signals may be noted as erasures for FEC module 310. Although FIG. 3 illustrates that two comparison modules 304 are used, one for each OLT 312 and 314, in other embodiments, one comparison module 304 may compare the streams from both OLTs. Information sharing between the two OLT receivers 312 and 314 via the comparison module(s) 304 may provide another dimension of reference for the decision making process. For a bit that one OLT receiver is unsure if it should be a "0" or a "1", which means the chance is near the 50:50 region, the result of the other receiver will be taken into consideration. For example, in one embodiment, the FEC module 310 may select a mostly like output based on the confidence factor of two independent receivers for the same bit. The confidence factor will be discussed in more detail in FIG. 4

After comparing the pre-corrected electrical signals, the comparison module 304 outputs the result to the FEC module 310 for FEC cooperative decoding using hard-decision FEC and/or soft-decision decoding. In one embodiment, the joint decoding node 116 and/or FEC module 310 may be configured to implement a second generation hard-decision FEC using a Reed-Solomon (255, 239) coding. Normally, this type of decoding has the capability to find and correct about 8 errors in a block. With cooperative FEC decoding, the joint decoding node 116 may now be capable of fixing up to 16 errors because at least some of the errors have become erasures. Consider in a more general case that some errors for E1, which represents the quantity of unidentified errors, may have been unidentified in the first stage. For example, all the OLT receivers agree with each other about their bit values, but all of the OLT receivers are incorrect. In the above identified case, these errors remain as errors, instead of erasures, in the block. Also, some errors E2, which represents the quantity of unidentified erasures, have become erasures because the values do not agree with each other amongst two or more OLT receivers. The error and/or erasure correction capability of the cooperative PON system 300 may be expressed in equation 1:

$$2*E1+E2 \le 16 \quad (1)$$

As a comparison, the capability of a typical PON system without OLT cooperation, where both E1 and E2 remain as errors, instead of erasures, is expressed in equation 2:

$$E1+E2 \le 8 \quad (2)$$

The cooperative FEC decoding may correct additional errors for E2. When all errors become erasure (e.g. when E1 equals to 0 and E2 may be doubled from up to 8 in a typical PON system to up to 16 when using FEC cooperative decoding), which means that with the overhead cost of about a 16-byte parity code, the FEC cooperative decoding may have the performance of a 32-byte parity code. In other words, the number of errors that the system may be capable of correcting may be doubled if all of the errors are defined as erasures.

Figure 4:
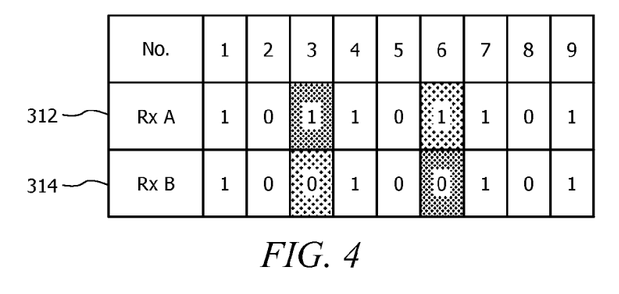
FIG. 4 illustrates an embodiment of a confidence factor table used to check for errors in an upstream transmission within a PON system.

FIG. 4 illustrates an embodiment of a confidence factor table used to check for errors in an upstream transmission within a PON system. As an example, assume the two receivers, Rx A 312 and Rx B 314 of OLT A and OLT B, respectively, receive the bit sequence shown in FIG. 4. For most of the bits, the two receivers agree with each other. For the $3^{rd}$ and $6^{th}$ bit, however, the two receivers obtain different values at different confidence factors. For the $3^{rd}$ bit, assume Rx A 312 believes that the data value is a "1" with moderate to high confidence, which is illustrated with a more densely covered square and Rx B 312 thinks the data value is "0" at low to moderate confidence, which is illustrated with a relatively less dense covered square. By jointly considering the confidence factors from both sides, Rx A 312 may conclude that the bit is relatively more likely to be a "1". Similarly, Rx A 312 may conclude that the $6^{th}$ bit, which may have deduced a data value of "1" by itself, may not determine that the data value is relatively more likely to be a "0" after taking Rx B 312's reference into consideration.

Through cooperation and/or comparison in the decision-making stage, some of the errors may be corrected by referencing the shared information from other receivers. The shared information may be either in analog or digital format; for example, with a lower voltage to indicate less confidence in the decision-making process and higher voltage for higher confidence. The comparison module(s) 304 may compare the confidence factor of multiple sides when the bit value is different in the two receivers 312 and 314 in order to determine whether to maintain its own decision, switch to the counterpart's decision, or place a question mark for the bit if the two confidence factors are close to each other.

After the comparison stage, through the information sharing mechanism at the joint decoding node 116, the primary designated OLT receiver may also know what data that other OLT receivers detected. Among the data, some bits may already have been corrected in the decision-making stage, and some mismatched bits may now be marked as susceptible. In other words, a primary OLT receiver (e.g. OLT receiver A 312) may have the knowledge that the cooperative OLT receivers are in agreement with some bits and not with other bits. Additionally, because the OLT receivers 312 and 314 are independent, their characterization may be different, and therefore, it is relatively more likely that their error bits are at different locations as well. Thus, after the decision-making stage, the primary OLT receiver may determine which bit could be an error before FEC cooperative decoding. This may turn the errors into erasure and FEC may be interpreted as forward erasure correction, whether the system uses hard-decision or soft-decision FEC coding.

Figure 5:
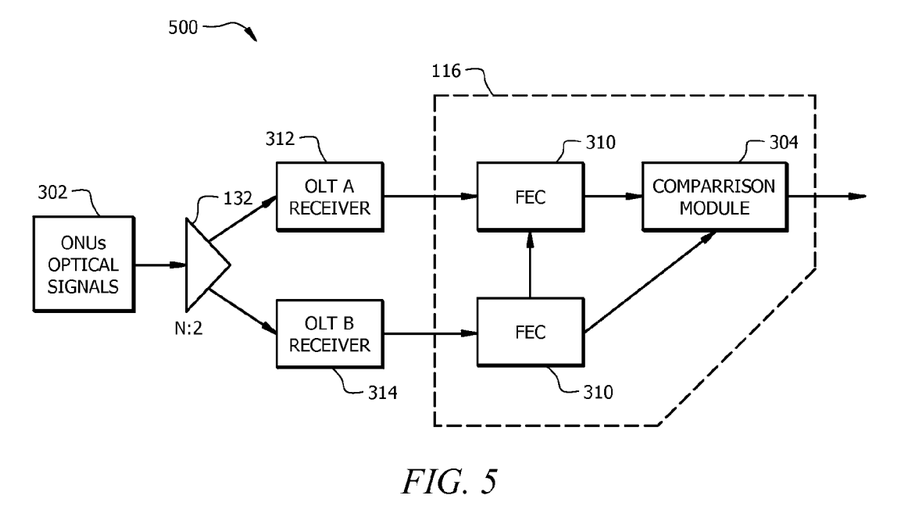
FIG. 5 illustrates another embodiment of a signal diagram used to check for errors in an upstream transmission within a PON system.

FIG. 5 illustrates another embodiment of a signal diagram used to check for errors in an upstream transmission within a PON system 500. A shown in FIG. 5, the electrical signals received from OLT A 312 and OLT B 314 could be FEC decoded separately within FEC modules 310. The FEC modules 310 may output the results to the comparison module 304 within the joint decoding node 116. In other words, the first and second stages of decision making described for FIG. 3 may be switched in FIG. 5. Specifically, in FIG. 5, the first stage may be represented by the FEC modules 310, wherein the decoder attempts to discover and correct errors in a received block separate. Afterwards, in the second stage the joint decoding node 116 uses the comparison module 304 to process the received decoded signal to determine any errors or discrepancies in the decoded signal.

In one embodiment, the comparison module 304 may use a simple majority type of decoding to determine the correct upstream data. A simple majority may be used to count the number of OLT receivers that perceive a data value for a specific bit within a block. The data value perceived by more of the OLT receivers may be used as the correct data value for an upstream data stream. Sharing the decision making and FEC decoding information between the jointly worked OLTs may improve the decision making confidence in soft-decision FEC receivers and may enhance the error-correction capability of the receivers in both hard-decision and soft-decision FEC decoders. Additionally receiver performance may be improved by reducing the bit error rate in the decision-making stage and FEC decoding stage of the receiving process, in ideal cases doubling the error correction capability of an individual receiver.

In some alternative embodiments, the joint decision node 116 may use other types of decoding to jointly decode the two signals. For example, the electrical signals from the OLT A receiver 312 and OLT B receiver 314 could be combined at the analog level to produce a single analog signal. When the received electrical signals are combined, the electrical signals (e.g. analog data signals) are amplified more than noise, producing a more accurate combined electrical signal. For example, combining the two received electrical signals may produce a combined electrical signal amplified by about two, and the noise would be amplified by about the square root of two. This approach may be especially effective for receiver-limited systems, in which the receiver noise dominates among the various impairments to the receiving signal. As a result, the different characterization of the multiple independent receivers may render errors at different locations in the received bit stream. For instance, when PONs are near the sensitivity limit of the OLT receivers, the extra noise of the APDs may contribute in receiving errors; therefore, the joint decision node 116 may fit into PON applications to improve system performance.

Figure 6:
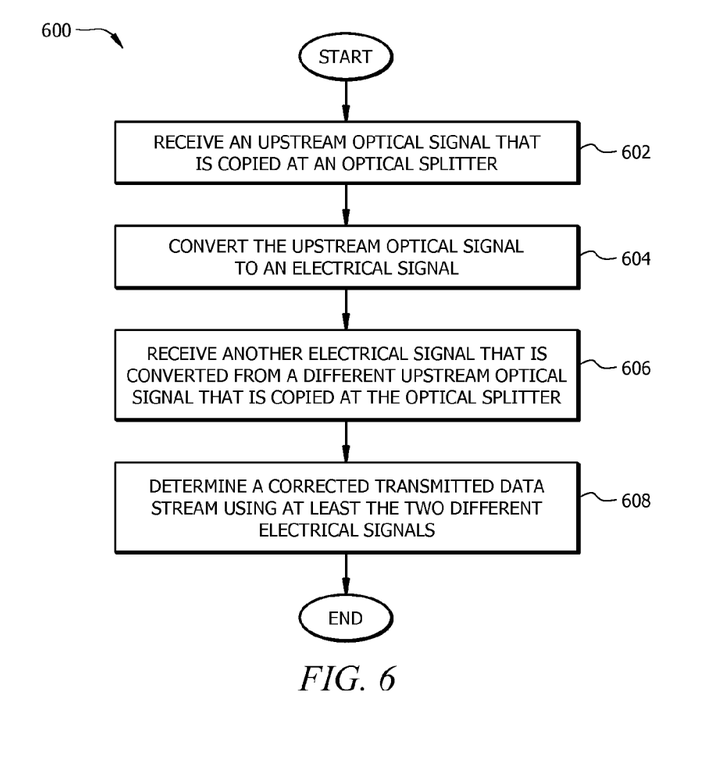
FIG. 6 is a flowchart of an embodiment of a method that checks for errors in an upstream transmission within a PON system.

FIG. 6 is a flowchart of an embodiment of a method 600 that checks for errors in an upstream transmission within a PON system. Method 600 may be implemented in a primary OLT or some other network device external to the primary OLT (e.g. backup OLT). At step 602, method 600 may receive an upstream optical signal that is copied at an optical splitter. At step 604, method 600 may convert the received upstream optical signal to an electrical signal. The electrical signal may be a pre-corrected electrical signal or a FEC corrected electrical signal. At step 606, method 600 may receive another electrical signal that is converted from a different upstream optical signal that is copied at an optical splitter. For example, if method 600 is implemented within a primary OLT, then at step 606, method 600 may receive another electrical signal from a backup OLT. At step 608, method 600 may determine a corrected transmitted data stream using at least the two different electrical signals. The upstream optical signals used to generate the electrical signals may be copies of an upstream optical signal generated from a plurality ONUs.

In some embodiments, determining the corrected transmitted data stream at step 608 of method 600 may comprise using cooperative FEC decoding as described above. In some embodiments, determining the corrected transmitted data stream at step 608 of method 600 may comprise the use of soft decoding, wherein soft decoding is based on more than one level of threshold to estimate if the receiving signal has a "1" or "0". In some embodiments, determining the corrected transmitted data stream at step 608 of method 600 may comprise comparing the information streams within the electrical signals to determine errors in each of the information streams before or after using FEC decoding. In some embodiments, comparing the information streams comprises examining the "1" or "0" signal for each stream and identifying errors. In some embodiments, determining the corrected transmitted data stream at step 608 of method 600 may comprise combining the electrical signals into one analog signal (e.g. at a voltage receiver) and determining a "1" or "0" signal based on the voltage level of the one analog signal.

Figure 7:
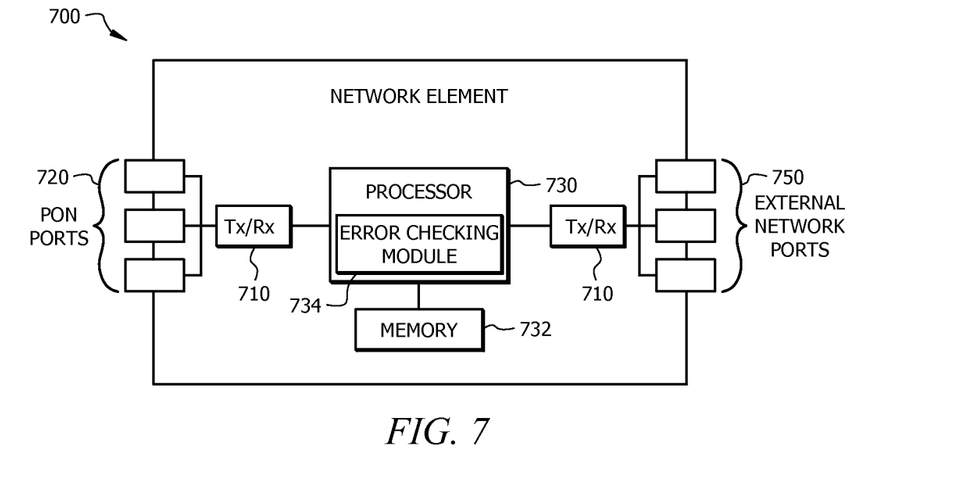
FIG. 7 is a schematic diagram of an embodiment of a network element within a PON system.

FIG. 7 is a schematic diagram of an embodiment of a network element 700 within a PON sub-network. For example, the network element 700 may be an OLT 110, as described in FIG. 1, or a port within an OLT 110. The network element 700 may be suitable for implementing one or more embodiments of systems, methods, and schemes disclosed herein, such as method 600. The network element 700 may be configured to transmit and/or receive optical signals that include, but are not limited to TWDM based transmissions over an optical fiber. The network element 700 may be implemented in a single node or the functionality of network element 700 may be implemented in a plurality of nodes. One skilled in the art will recognize that the term network element encompasses a broad range of devices of which network element 700 is merely an example. Network element 700 is included for purposes of clarity of discussion, but is in no way meant to limit the application of the present disclosure to a particular network element embodiment or class of network element embodiments. At least some of the features/methods described in the disclosure may be implemented in a network apparatus or component such as a network element 700. For instance, the features/methods in the disclosure may be implemented using hardware, firmware, and/or software installed to run on hardware.

As shown in FIG. 7, the network element 700 may comprise transceivers (Tx/Rx) 710, which may be transmitters, receivers, or combinations thereof. A Tx/Rx 710 may be coupled to a plurality of PON ports 720 (e.g. downstream interfaces) for transmitting and/or receiving frames from ONUs within an optical access network and a Tx/Rx 710 coupled to a plurality of external network ports 750 (e.g. upstream interfaces) for transmitting and/or receiving frames from nodes with an external network, such as a metro network or a service provider core network. A processor 730 may be coupled to the Tx/Rxs 710 to process the frames and/or determine which nodes to send frames to. The processor 730 may comprise one or more multi-core processors and/or memory devices 732, which may function as data stores, buffers, etc. Processor 730 may be implemented as a general processor or may be part of one or more application specific integrated circuits (ASICs), field programmable gate array (FPGA), and/or digital signal processors (DSPs).

Processor 730 may comprise an error checking module 734, which may implement the methods discussed herein, such as scheduling transmission of optical signals over one or more ODNs. The error checking module 734 may determine the errors based by comparing incoming data information. In one embodiment, the error checking module 734 may be implemented within the network element 700 when the network element 700 is an OLT. In another alternative embodiment, the error checking module 734 may be implemented on a separate network element 700 external to an OLT. The PON ports 720 and/or external network ports 750 may comprise electrical and/or optical transmitting and/or receiving components.

It is understood that by programming and/or loading executable instructions onto the network element 700, at least one of the processor 730, error checking module 734, Tx/Rxs 710, memory 732, PON ports 720, and/or external network ports 750 are changed, transforming the network element 700 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose central processing unit (CPU) inside a computer system) in a computer system (e.g., an OLT or an ONU) to execute a computer program. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (ROM) (CD-ROM), compact disc recordable (CD-R), compact disc rewritable (CD-R/W), digital video disc (DVD), Blu-ray (registered trademark) disc (BD), and semiconductor memories (such as mask ROM, programmable ROM (PROM), erasable PROM), flash ROM, and random access memory (RAM)). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus for detecting errors within a passive optical network (PON), comprising:
   a memory;
   a processor coupled to the memory, wherein the memory includes instructions that when executed by the processor cause the apparatus to perform the following:
      obtain a first information stream from a first upstream optical signal;
      obtain a second information stream from a second upstream optical signal;
      generate a corrected information stream using at least the first information stream and the second information stream by comparing the first information stream to the second information stream in order to determine errors in each of the first and second information streams; and
      perform forward error correction (FEC) decoding on the corrected information stream, wherein the first upstream optical signal and the second upstream optical signal are received at an optical line terminal (OLT) and from an optical distribution network (ODN).

2. The apparatus of claim 1, wherein the first and second upstream optical signals are two copies of one signal received from the ODN.

3. The apparatus of claim 2, wherein the first and second upstream optical signals are generated at a splitter between the ODN and the OLT.

4. The apparatus of claim 1, wherein generating the corrected information stream comprises combining the first information stream and the second information stream into a combined signal.

5. A method for error detection within a passive optical network (PON), the method comprising:
   receiving a first upstream optical signal that is copied at an optical splitter;
   converting the first upstream optical signal to a first electrical signal;
   receiving a second electrical signal that is converted from a second upstream optical signal that is copied at the optical splitter;
   generating a corrected data stream using the first electrical signal and the second electrical signal by comparing the first electrical signal to the second electrical signal in order to determine errors in each of the first and second electrical signals; and
   performing forward error correction (FEC) decoding on the corrected data stream,
   wherein the first upstream optical signal and the second upstream optical signal are copies of an upstream optical signal generated from a plurality of optical network units (ONUs).

6. The method of claim 5, wherein performing FEC decoding on the corrected data stream comprises performing the FEC decoding separately on the first electrical signal and the second electrical signal.

7. The method of claim 5, wherein generating the corrected data stream comprises the use of soft decoding, and wherein soft decoding is based on more than one level of threshold to estimate whether the first electrical signal and the second electrical signal have a data value of one or zero.

8. The method of claim 5, wherein performing FEC decoding on the corrected data stream comprises performing FEC decoding on a combined signal of the first electrical signal and the second electrical signal.

9. The method of claim 5, further comprising determining a confidence factor for data within the first electrical signal and the second electrical signal.

10. The method of claim 9, wherein the confidence factor for the data within the first electrical signal and the second electrical signal is used to generate the corrected data stream.

11. The method of claim 5, wherein generating the corrected data stream comprises combining the first electrical signal and the second electrical signal into a combined signal.

12. An apparatus for error detection within a passive optical network (PON), comprising:
   a memory;
   a processor coupled to the memory, wherein the memory includes instructions that when executed by the processor cause the apparatus to perform the following:
      receive a first electrical signal from a first optical line terminal (OLT), wherein the first OLT receives a first upstream optical signal copied at an optical splitter;
      receive a second electrical signal from a second OLT, wherein the second OLT receives a second upstream optical signal copied at the optical splitter;
      generate a corrected data stream using at least the first electrical signal and the second electrical signal by comparing the first electrical signal to the second electrical signal in order to determine errors in each of the first and second electrical signals; and
      perform forward error correction (FEC) decoding on the corrected data stream,
      wherein the first upstream optical signal and the second upstream optical signal are copies of an upstream optical signal generated from a plurality of optical network units (ONUs).

13. The apparatus of claim 12, wherein performing FEC decoding on the corrected data stream comprises performing the FEC decoding separately on the first electrical signal and the second electrical signal.

14. The apparatus of claim 12, wherein generating the corrected data stream comprises the use of soft decoding, and wherein soft decoding is based on more than one level of threshold to estimate whether the first electrical signal and the second electrical signal have a data value of one or zero.

15. The apparatus of claim 12, wherein generating the corrected data stream comprises combining the first electrical signal and the second electrical signal into a combined signal.

16. The apparatus of claim 12, wherein performing FEC decoding on the corrected data stream comprises performing FEC decoding on a combined signal of the first electrical signal and the second electrical signal.

17. The apparatus of claim 1, wherein performing FEC decoding on the corrected information stream comprises performing FEC decoding on the first information stream and the second information stream separately.

18. The apparatus of claim 1, wherein performing FEC decoding on the corrected information stream comprises performing FEC decoding on a combined signal of the first information stream and the second information stream.

* * * * *

UNITED STATES PATENT AND TRADEMARK OFFICE
CERTIFICATE OF CORRECTION

PATENT NO. : 9,590,724 B2
APPLICATION NO. : 14/282879
DATED : March 7, 2017
INVENTOR(S) : Frank J. Effenberger and Lei Zong Page 1 of 3

It is certified that error appears in the above-identified patent and that said Letters Patent is hereby corrected as shown below:

On the Title Page

The figure should be replaced with the following:

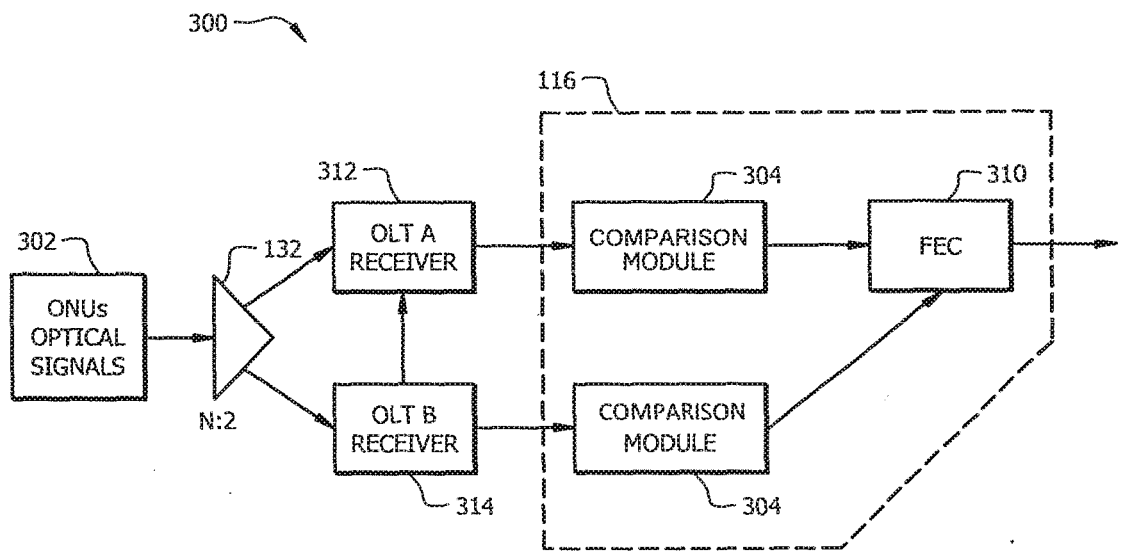

In the Drawings

Sheet 2, FIG. 3, should be replaced with the attached page.

Sheet 3, FIG. 5, should be replaced with the attached page.

Signed and Sealed this
Thirtieth Day of May, 2017

Michelle K. Lee
*Director of the United States Patent and Trademark Office*